Patented May 14, 1929.

1,713,482

UNITED STATES PATENT OFFICE.

RUDOLF ROLAND, OF JACKSON HEIGHTS, NEW YORK, ASSIGNOR TO ROLAND FIRE-PROOF CELLULOID CORPORATION, OF FLUSHING, NEW YORK, A CORPORATION OF NEW YORK.

CELLULOID COMPOUND.

No Drawing.     Application filed March 2, 1928. Serial No. 258,695.

This invention provides a compound or composition which in the industrial arts is susceptible for all uses for which celluloid is adapted but which is non-inflammable and free from fire hazard, and which will not dry out and become brittle upon exposure to the atmosphere.

In preparing one hundred pounds of the compound or composition the following ingredients are employed in about the proportions stated, that is:

| | Pounds. |
|---|---|
| Acetyl cellulose | 25 |
| Alcohol (methyl or ethyl) | 25 |
| Chlorbenzol | 10 |
| Tetrachlorethane | 10 |
| Benzyl benzoate | 10 |
| Triacetine | 10 |
| Dichlorhydrin | 10 |

The constituents are placed in a suitable container and heated to approximately 75 degrees centigrade and stirred until the acetyl cellulose is dissolved and the mass becomes of a viscous consistency. The viscous mass is subjected to an evaporating process to eliminate an excess of fluid and reduce it to a plastic or workable condition for molding and pressing into the required shape. Pigments or coloring matter of any kind may be added to the viscous or plastic mass according to the desired appearance of the finished article.

Articles formed from the compound or composition are non-inflammable and will retain their elasticity and toughness for an indefinite period. Moreover, sheets of the compound or composition are clear and will not crack or break, hence are admirably adapted for windows in curtains and vehicle tops.

Having thus described the invention, I claim:

1. A composition capable of forming a flexible, transparent and non-inflammable sheet or film consisting of the following ingredients: acetyl cellulose, alcohol, chlorbenzol, tetrachlorethane, benzyl benzoate, triacetine, and dichlorhydrin.

2. A composition capable of forming a flexible, transparent and non-inflammable sheet or film consisting of the following ingredients in approximately the proportions stated: acetyl cellulose twenty-five pounds, alcohol twenty-five pounds, chlorbenzol ten pounds, tetrachlorethane ten pounds, benzyl benzoate ten pounds, triacetine ten pounds, and dichlorhydrin ten pounds.

3. The method of preparing a composition of the nature specified which consists in placing acetyl cellulose, alcohol, chlorbenzol, tetrachlorethane, benzyl benzoate, triacetine and dichlorhydrin in a container which is heated to about seventy-five degrees centigrade, then stirring the mass until the acetyl cellulose is dissolved and the mixture assumes a viscous consistency, and then subjecting the viscous mass to an evaporating process until it becomes plastic.

In testimony whereof I affix my signature.

RUDOLF ROLAND. [L. S.]